Nov. 14, 1933.   N. L. NATALI   1,935,057
CONVERTIBLE WAGON
Filed Jan. 28, 1932   2 Sheets-Sheet 1

INVENTOR.
Nicolas Lorenzo Natali.
BY
ATTORNEY.

Nov. 14, 1933.  N. L. NATALI  1,935,057
CONVERTIBLE WAGON
Filed Jan. 28, 1932   2 Sheets-Sheet 2

INVENTOR.
Nicolas Lorenzo Natali.
BY
ATTORNEY.

Patented Nov. 14, 1933

1,935,057

UNITED STATES PATENT OFFICE 1,935,057

CONVERTIBLE WAGON

Nicolas Lorenzo Natali, Ingeniero White, Argentina

Application January 28, 1932, Serial No. 589,342, and in Argentina October 22, 1931

3 Claims. (Cl. 105—243)

My invention relates to freight cars or trucks and more particularly consists in a car or truck which can readily be converted so as to be used either for the transportation of general merchandise or for grain or other material in bulk. The particular object of the present invention is to produce a convertible car or truck which can be easily loaded and unloaded with a minimum expenditure in time and labor. The invention is of a nature that it can be also applied to existing cars or trucks, and the loading and unloading of a car or truck embodying this invention can be accomplished in a very brief time by only one operator. On the arrival of a car or truck at its destination, after the goods have been unloaded, it can be quickly converted into a car or truck for carrying grain or other material in bulk, and, in accordance with this invention, automatic unloading of the car is provided for in that case.

For a fuller understanding of my invention, I refer to the annexed drawings showing, by way of illustration, a freight car embodying the invention, and on which drawings Fig. 1 is a longitudinal view of the car, the left and right hand part showing the car respectively for the loading of general merchandise and for the discharge of grain in bulk;

Figure 4:
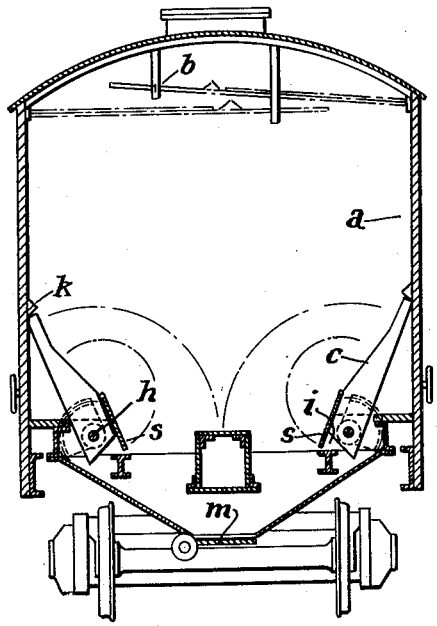
Fig. 4 is a sectional view of the car as seen from one end showing the position of the parts for the loading of grain or other material in bulk.

The construction comprises on either side wall of the car a counter door $a$ suspended in front of the ordinary door and supported by a hook $b$ so as not to interfere, when in raised position, with the loading and unloading of general merchandise. The counter doors $a$ are safely suspended so that they will not drop as a consequence of the severe shocks to which the car is subjected. The floor is divided, forming wings $c$ which, by means of a worm gear $d$ located on the outside of the car near the shock-absorbers and engaging a toothed sector on a shaft connected to the wing $c$ can be raised to an inclined position to such an extent that, as shown in Fig. 4, they abut against a triangular iron bar $k$. When the wings are thus inclined, the floor assumes the form of a hopper for the reception of grain or other material in bulk. The shaft connected to each wing $c$ is journalled in bearings $i$. At $j$ is shown a flywheel mounted on the stem of the worm gear $d$.

Underneath the floor of the car, various hoppers $l$ are provided which are shut by valve $m$ operated by flywheel $n$ mounted on a small shaft $o$ provided with two sprocket wheels $p$, which latter, by means of a rack, allow of opening valve $m$, so as to permit the grain or other material to be discharged.

Underneath the wing parts $c$ forming the floor, and in register with the corresponding bearings $i$ are provided small plates $s$ which, as indicated by the dotted lines in Fig. 4 can be turned up so as to cover the bearings $i$, as shown in Fig. 4 preventing the grain or other material from dropping into the bearings.

Figure 1:
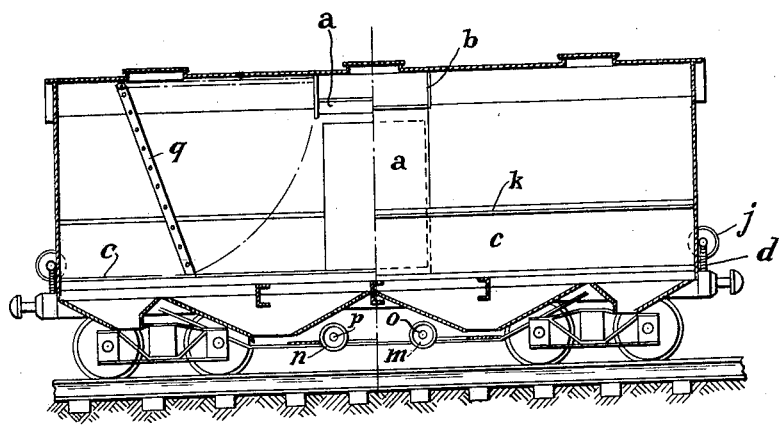
Figure 2:
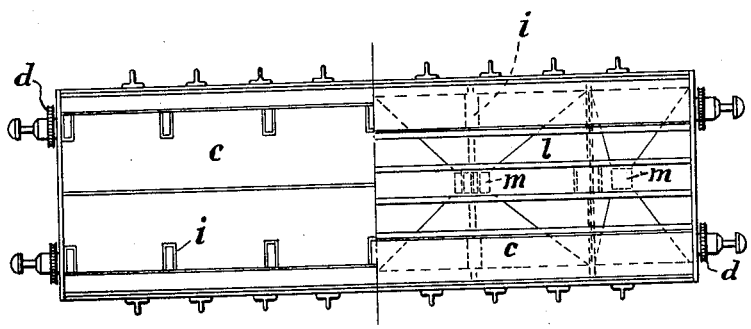
Fig. 2 shows the arrangement of the floor of the car, the left hand part to receive general merchandise and the right hand part grain in bulk.

$q$ shown in Fig. 1 is a movable ladder giving the operator access to the car for cleaning it.

The operation is as follows: When the car has been used for the transportation of general merchandise and shall be changed into a car for receiving grain or other material in bulk, the procedure is as follows: First, the counter doors $a$ are released from the hooks $b$ to cover the ordinary side doors, then, the flywheels $j$ are rotated to operate the worm gears $d$ for raising the wings $c$ to the inclined positions shown in Fig. 4.

Figure 3:
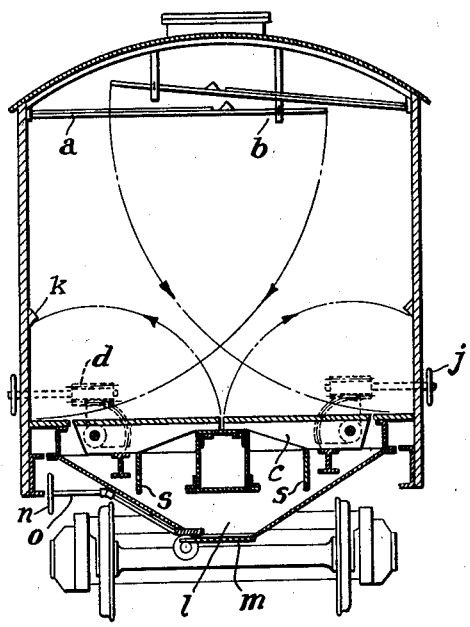
Fig. 3 is a sectional view of the car as seen from one end showing the parts in position for the loading of general merchandise.

For discharging the car or truck, the flywheels $n$ (Fig. 3) are rotated to open the valves $m$ allowing the grain or other material to escape.

I claim:

1. A convertible car comprising a floor composed of movable parts, capable of being turned upwards around fixed bearings and folding up against the sides of the car, hoppers underneath said floor, counter-doors normally suspended and adapted to cover up the side doors when dropped, means mechanically actuated from the outside of the car for raising and lowering the movable floor parts and for opening and closing said hoppers, said counter-doors having butts constituting shedding surfaces to protect the upper edges of said movable floor parts when in their raised position.

2. A convertible car as specified in claim 1, including folding ladders adapted to give access to the interior of the car.

3. A convertible car as specified in claim 1, including movable plates adapted to cover the spaces around the bearings of the movable floor parts when in their raised position.

NICOLAS LORENZO NATALI.